Figure 1:
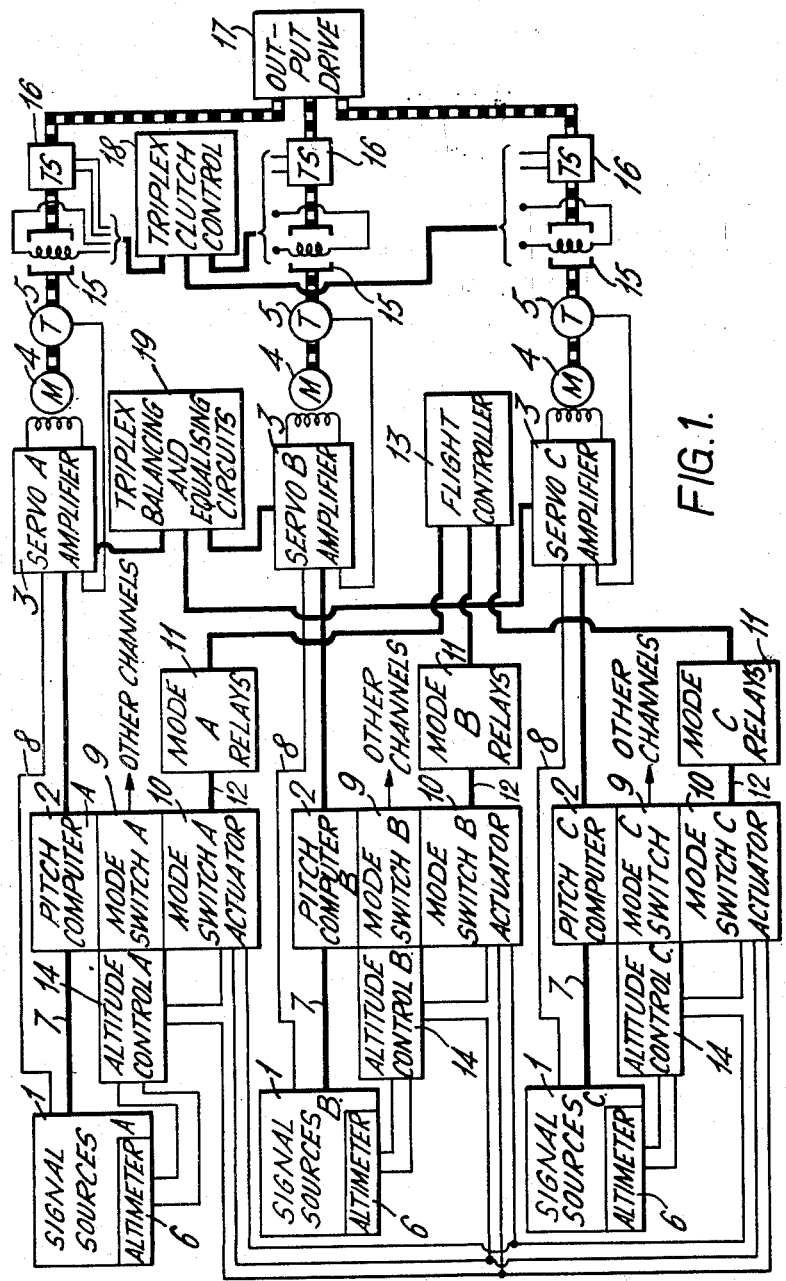

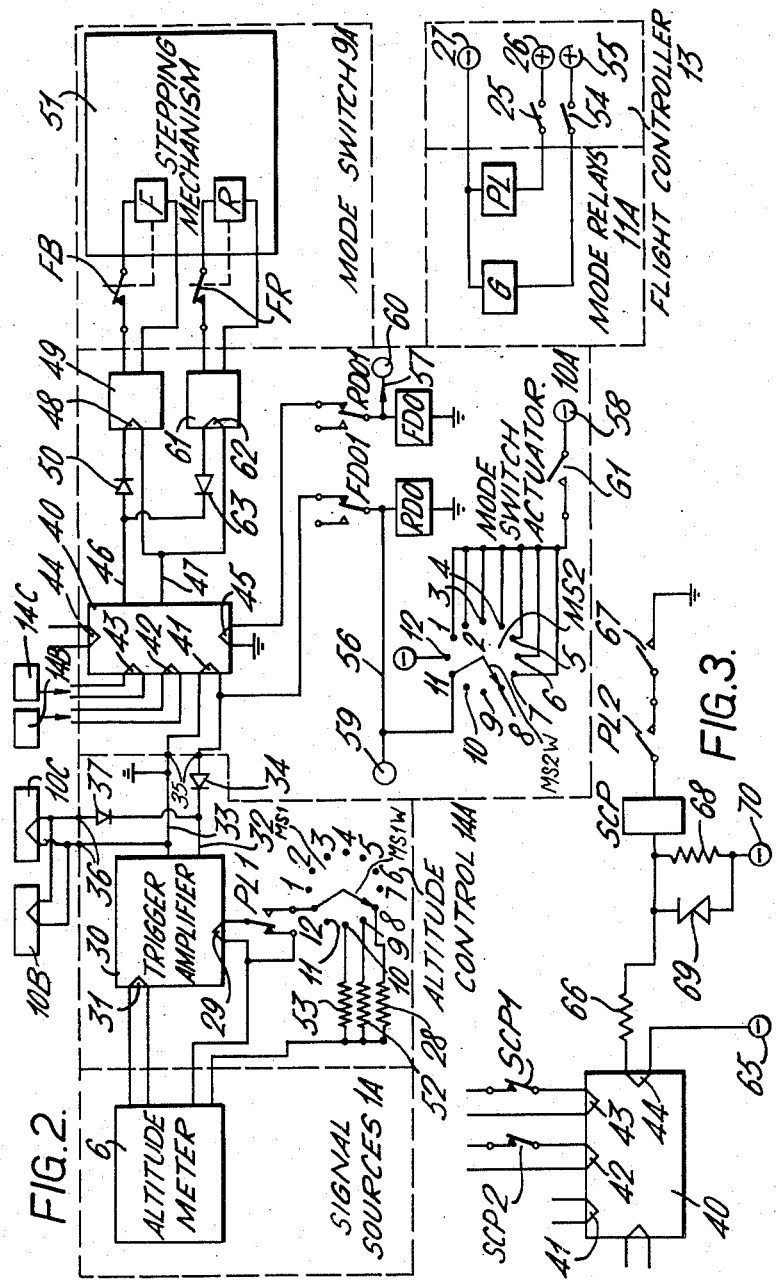

United States Patent Office 3,190,586
Patented June 22, 1965

3,190,586
AUTOMATIC CONTROL SYSTEMS
David William Righton, Cheltenham, England, assignor to S. Smith & Sons (England) Limited, London, England, a British company
Filed July 13, 1962, Ser. No. 209,623
Claims priority, application Great Britain, July 14, 1961, 25,526/61
17 Claims. (Cl. 244—77)

The present invention relates to automatic control systems and in particular to automatic control systems in which, for some purpose, a control channel includes a plurality of sub-channels arranged to operate in parallel. For example, in an automatic flight control system for an aircraft, it has been proposed to provide triplicate sub-channels in each channel of the system, that is to say in each of the aileron, rudder and elevator channels, in order to reduce the possibility that faults arising during operation might give rise to conditions likely to endanger the safety of the aircraft being controlled by the system.

A separate requirement may arise in automatic control systems to provide some means for effecting a switching sequence under the control of a signal representing a variable quantity which is applied to or is generated within the system. For example, in an automatic flight control system for controlling an aircraft during a landing manoeuvre, switching may be carried out at certain predetermined heights under the control of a signal representing the aircraft's height, the operational mode of the system being changed at each step in the switching sequence by changing the signal sources to which the system is coupled and/or the control laws of the system, as may be appropriate to the various stages of the landing manoeuvre. Where a switching sequence of this nature is carried out in a control channel having a plurality of parallel sub-channels, it may be necessary to ensure that a given step in the switching sequence is not effected in any one of the sub-channels appreciably before or after it is effected in the others. Even in normal operation, slight differences in the characteristics of the sub-channels may give rise to a difference in timing which would not be acceptable.

According to one aspect of the present invention, in an automatic control system which includes a plurality of sub-channels that operate in parallel with one another and are selectively switchable from a first operational mode to a second operational mode appropriate to the circumstances in which a predetermined variable quantity has attained a predetermined value, there is provided the combination comprising: means to supply controlling signals in accordance with the variable quantity; a plurality of signal-discriminating means associated one with each sub-channel and responsive to said controlling signals to emit a predetermined switching signal when the variable quantity attains at least substantially said predetermined value; and a plurality of switching-control means coupled to said plurality of signal-discriminating means and associated one with each sub-channel, each switching-control means being operative to switch its associated sub-channel from the first operational mode to the second operational mode in response to the condition in which a predetermined number, greater than one, of said signal-discriminating means emit said predetermined switching signal.

Where the number of sub-channels is three, the predetermined number will usually be two, although it could in some exceptional cases be three where it would be acceptable that one incorrectly operating sub-channel might hold up the operation of the other two. In general, where there are more than two sub-channels, said predetermined number is preferably such that the switching-control means is operative only in response to the condition in which the signal-discriminating means of a majority of the sub-channels emit said switching signal.

Each sub-channel may include means for defining sequentially different datum values of said variable quantity in response to switching of the sub-channels through the different modes of a predetermined sequence of operational modes, and in this case the signal-discriminating means may be responsive to the controlling signal and to the datum value defined by the datum-selecting means to emit said switching signal when the said variable quantity attains the defined datum value, the switching-control means being operative to switch the sub-channel from one mode to the next in said predetermined sequence of operational modes in response to the condition in which the predetermined switching signal is emitted by the signal-discriminating means of said predetermined number of sub-channels.

By way of example of a system according to the present invention, there will now be described parts of one channel of an automatic flight control system for an aircraft. In this description reference will be made to the accompanying drawings in which:

FIGURE 1 shows a block circuit diagram of the elevator channel of the system, and
FIGURES 2 and 3 show more detailed circuitry of sub-channels of the elevator channel.

The system to be described is a comprehensive one capable of landing an aircraft under automatic control, the basic principle of operation being similar to that of the system described in an article entitled "Blind Landing" by W. J. Charnley on pages 115–135 in vol. XII, No. 2, of the Journal of the Institute of Navigation, to which reference may be made for details.

In such a system, the landing manoeuvre may be divided into the following phases:

(i) Manoeuvring to fly onto a glidepath as defined by the localiser and glidepath beams of a conventional I.L.S. system; termed the "track phase."

(ii) Flying down the glidepath, maintaining constant airspeed and pitch attitude; termed the "glide phase."

(iii) From a height of say 150 ft., the glidepath signals of the I.L.S. system being no longer usable, continuing to fly down an extension of the glidepath, maintaining the same airspeed and the mean attitude subsisting during the last part of the aforementioned glide phase; termed the "attitude phase."

(iv) From a height of say 50 ft., commencing the flare that is to say starting to follow a path which in the vertical plane, is curved so as to level out smoothly to the surface of the runway and at the same time closing the throttles; termed the "flare phase"; and (v) From a height of say 20 ft., continuing the flare, and controlling the rudder and ailerons so as to rotate the aircraft in yaw, maintaining the wings level, to align its fore and aft axis with the runway; termed the "land phase."

To carry out such a manoeuvre, it is necessary, in passing from one phase to another, to change the signal sources to which the system is coupled and/or to change the control laws which the system obeys. In the system to be described, which is representative of an electrical embodiment of the present invention, the required changes are effected by a rotary stepping switch having a number of banks of contacts associated with electrical computing networks provided in the system. There is a different position of the switch for each phase of the landing manoeuvre, and the switch has an electromagnetic stepping mechanism which is actuated automatically, under the control of signals representing the aircraft's height (derived from a frequency modulated radio altimeter), to position the switch appropriately for each of the last three phases of said landing manoeuvre.

Besides the positions corresponding to the last three phases of the landing manoeuvre, the switch has a position for the aforementioned track and glide phases during which the same control law and signal sources are employed, and the switch also has various other positions for other modes of operation of the elevator channel of the system, for example "attitude lock," "height lock" and "I.A.S. lock" modes among others. These modes are selectable manually by the operation of switches provided on a master flight controller, and switching circuits are provided which include a number of banks of contacts of the switch and relays operable under the control of the flight controller switches, to position the switch according to the selected mode. There is no automatic switching sequence involved in the selection of these other positions, and details of these circuits with which the present invention is not concerned will not be given here with the exception of the one part operable to select the track and glide phases. This latter selection must be made manually before the automatic landing sequence can be initiated.

When, during the landing manoeuvre, phase switching signals are required in the aileron and rudder channels, for example at the commencement of the land phase, these signals are supplied from one or more banks of contacts of the switch in the elevator channel. Other modes of these other channels are selectable manually, however, under the control of the flight controller.

Referring now to the drawings, FIGURE 1 shows a block circuit diagram of the three sub-channels A, B and C of the elevator channel. Of these, only sub-channel A will be described in detail, the others being identical except where specific differences are mentioned. Identical parts of the different sub-channels will be given the same numerical references and will be distinguished only where necessary by adding A, B or C to the reference concerned to indicate the sub-channel to which a particular element belongs.

The basic elements of sub-channel A are the signal source 1, a pitch computer 2 and a rate/rate servo system including a servo amplifier 3, a two-phase electrical servo motor 4 and a tachometer generator 5. The generator 5 is driven by the motor 4 and provides a signal representing the rate of rotation of the motor shaft which signal is fed back to an input of the amplifier 3.

The signal sources 1 may include in known manner rate gyroscopes, a vertical gyroscope, a glide path radio receiver and sources of signals representing the departure of various quantities from selected values thereof. These last signals, representing for example the departure of the aircraft's altitude or its indicated air speed from a datum value, may be derived in known manner in an air data computer which is supplied with pneumatic signals from a pitot/static head. The signal sources 1 further include a frequency-modulated radio altimeter 6 which is represented by a separate block within the block representing the sources 1. In known manner, this provides two output signals, one signal representing the aircraft's altitude and the other a reference signal which may be regarded as representing a datum height. It is arranged within the altimeter 6 that, as far as possible, any variation in the operating conditions likely to affect the magnitude of the altitude signal, without there being any corresponding change of altitude, cause a similar variation in the reference signal.

The sources 1 are coupled to the pitch computer 2 by a connection 7. The connection 7 is shown in heavy line in FIGURE 1, to indicate that it represents multiple connections, for example in this case a pair of leads or a coaxial cable connecting each signal source separately to the pitch computer 2. This convention is used at various places in FIGURE 1, and is to be understood to so apply wherever used without further reference in this specification.

In addition, the signal sources 1 are shown coupled to the servo amplifier 3 by a single connection 8 (each single connection shown in FIGURE 1 is to be understood to include go and return paths), this connection being used to supply to the servo amplifier 3 a signal representing the aircraft's rate of pitch $D\theta$ relative to a set of gravity axes (D being the operator representative of differentiation with respect to time and $\theta$ being the pitch angle of the aircraft). This signal may be generated within the signal sources 1, for example by combining the outputs of pick offs associated with two rate gyroscopes mounted in fixed positions in the aircraft so as to measure the aircraft's rates of rotation $q$ and $r$ about its pitch and yaw axes. The outputs may be combined in a resolver which has its rotor positioned in accordance with the aircraft's bank angle $\phi$, to give an output signal $D\theta$ defined by the equation:

$$D\theta = (q \cos \phi - r \sin \phi)$$

The pitch computer 2 operates in all modes to generate a signal representing a demanded (indicated by subscript $d$) rate of pitch $(D\theta)_d$. This, or a function of it, is combined in the servo amplifier 3 with the signal representing $D\theta$ from connection 8, or a function of it, to provide a signal representing a demanded rate of elevator movement which is opposed, in known manner to provide a rate/rate servo system, by the rate feed back signal from the tachometer generator 5. The form of the output from the pitch computer 2 will usually be different for every mode and is determined within the pitch computer 2 by the position of a mode switch 9 (which is the rotary stepping switch referred to previously). Banks of contacts of this switch 9 are connected in the circuits of the pitch computer 2 in such a manner as to determine, for each mode, the form of the output signal derived from the signals applied to the computer 2 from the signal sources 1. The computer 2 which includes, in addition to the switch contacts, various amplifiers, shaping networks and other circuit elements, will not be described in detail here as this particular construction is not relevant to the present invention.

The mode switch 9 is controlled by a mode switch actuator 10 which itself includes various banks of contacts of the mode switch 9, so that it may be caused to step to any selected one of the positions for the manually selectable modes and automatically to carry out the switching sequence for a landing manoeuvre, having initially been set under manual control to the position appropriate to the track and glide phases of the landing manoeuvre.

The relays referred to previously, which are required to condition the mode switch actuator 10 to select the manually selectable modes, are included within the block 11 shown in FIGURE 1. This block 11 is connected to the actuator 10 by a multi-lead connection 12 which is to be understood to include the linkages between relay coils in the block 11 and the corresponding contacts in the actuator 10. In addition, the mode relays in block 11 are connected to a flight controller 13 which is common to all three sub-channels, and which includes switches and other manually operable controls for selectively energising the relays required to bring about operation in any required mode. It will be appreciated that the flight controller 13 is also linked to similar switch controls in the other channels, for example the aileron and rudder channels, of the system.

To bring about the automatic switch sequence required during a landing manoeuvre under the control of signals representing the aircraft's altitude, sub-channel A further includes an altitude control 14 to which both the outputs of the altimeter 6 are supplied, that is to say, both the altitude signal and the reference signal. The altitude control 14 includes a bank of contacts of the mode switch 9, and is in addition coupled to the mode switch actuator 10 to supply to it the control signals necessary to bring about the automatic switching sequence.

Turning now to the output end of the sub-channel, the arrangements are shown only in simplified form. They include an electro-magnetic clutch 15, the input member of which is driven by the shaft of the motor 4 and the output member of which, when the clutch is energised, provides a drive through a torque switch 16 to the output drive 17 which is common to all three sub-channels. This will include some form of drive in parallel from the output shafts of the three sub-channels to actuators or some other form of drive for positioning of the aircraft's elevator(s).

The operating coil of the clutch 15 and the contacts of the torque switch 16 are connected, in the manner described in British patent specification No. 901,458, to a triplex clutch control circuit 18 common to all three sub-channels. Control circuit 18 is arranged to operate so that, if the output of any sub-channel differs appreciably from those of the other two to the extent that the torque transmitted by its torque switch 16 exceeds a predetermined value, the clutch 15 in that sub-channel will be disengaged, rendering that sub-channel ineffective. The circuit 18 is further arranged to operate so that if the predetermined torque is exceeded in only one of the torque switches 16, the sub-channel to which it belongs is disengaged and the other two sub-channels continue to operate in the normal way. If, however, the predetermined torque is later exceeded in either of the other two torque switches 16, the clutches 15 are disengaged in both the remaining operative sub-channels.

Allied to this is the provision of a triplex balancing and equalising circuit 19 which also is common to all three sub-channels and is linked to the three servo amplifiers 3. This may, for example, take the form described in either U.S. Patent No. 3,054,039 or No. 3,125,712, issued respectively on September 11, 1962 and March 17, 1964 in the name of D. L. Meredith and both relating to plural channel servo systems, or it may take the form described in prior copending U.S. patent application Serial No. 160,796 of D. W. Righton and R. J. Treadwell, filed December 20, 1961, now Patent No. 3,156,855, and relating to servo systems having a plurality of independent sub-channels arranged to actuate a common output. The circuit 19 operates in the manner described in these specifications to ensure that the outputs of the three sub-channels will be equal, or substantially so, thus avoiding disengagement of any of the clutches 15 despite any small differences in operating characteristics or signal levels which may arise between the sub-channels in operation and which are within reasonable and permissible limits. Further, as described in the aforesaid specifications, the circuit 19 may be coupled to the pitch computers 2 to receive what are termed, in those specifications, the "long term components" of the demand signals applied to the amplifiers 3. This interconnection is not shown in FIGURE 1 to avoid complication.

FIGURE 2 of the accompanying drawings shows in greater detail the circuits of the elements 9–14 of channel A. Dealing first with the altitude control 14A, this includes one bank of contacts MS1 of the mode switch 9. This has twelve fixed contacts MS1/1–12 and a wiper MS1W which makes contact with one or other of the twelve contacts depending on the position of the switch. The wiper MS1W is permanently connected to contact MS1/12. In FIGURE 2, the wiper MS1W is shown in contact with contact MS1/8, position 8 being that which the switch 9 takes up for the track and glide modes of an automatic landing. The sequence switching during the landing will be described first, and the manner in which the switch 9 is set to this initial condition, essential for the commencement of the sequence, will be described afterwards.

As part of the operational procedure of an automatic landing, the system provides that a special switch 25, referred to as the "prime land" switch, in the flight controller 13 has to be closed once the aircraft is properly established on the glide path. When this occurs, a circuit is completed from terminal 26 through switch 25 and the winding of a relay PL to terminal 27, thereby energising relay PL. When relay PL is energized, contact PL1 in the altitude control 14 changes over from the condition shown in FIGURE 2 to complete a circuit through the contact PL1, the bank MS1 of the mode switch 9 (this is assumed to be in position 8) and a resistor 28, coupling the reference output of altimeter 6 to a first input or control winding 29 of a magnetic trigger amplifier 30. The magnitude of resistor 28 is determined so that the voltage applied to the control winding 29 represents the altitude selected for the commencement of the attitude phase of the landing. It will be assumed here that this is 150 ft. The altitude output of altimeter 6 is applied directly to a second input winding 31 of amplifier 30. Amplifier 30 is a high gain low-drift magnetic amplifier and is arranged to give an output signal across its output leads 32 and 33 which takes a positive value (the polarity of the signal is considered positive or negative depending upon whether lead 32 is positive or negative with respect to lead 33 which is grounded) if the signal applied to input winding 31 is greater than that to input winding 29. If the opposite condition holds, the output takes a negative value. The output of amplifier 30 will thus be either a positive or a negative value according to whether the aircraft's altitude is greater or less than 150 ft., the amplifier 30 being arranged in known manner so that the change from the one value to the other occurs substantially instantaneously. The altitude control 14A further includes a diode 34 connected so that there is an output signal at output terminals 35 only when the output of amplifier 30 is negative. A similar output appears at terminals 36, by virtue of the provision of parallel leads and a further diode 37. Terminals 36 are connected, for a purpose which will be described below, in parallel to the mode switch actuators 10B and 10C, as indicated diagrammatically in FIGURE 2. Terminals 35 are connected to the mode switch actuator 10A.

The mode switch actuator 10A includes a second magnetic trigger amplifier 40 which has five input windings 41–45 of which windings 44 and 45 will be ignored for the moment. Winding 41 is connected across the output terminals 35 of the altitude control 14A, whilst windings 42 and 43 are connected across the similar output terminals 36 of the altitude controls 14B and 14C, as indicated diagrammatically in FIGURE 2. The amplifier 40 has output leads 46 and 47, and is arranged so that its output is zero unless a signal of a predetermined amplitude is applied to either two or three of the input windings 41–43. The predetermined amplitude is the same for each winding and is that which occurs when the amplifier 30 of the corresponding altitude control 14 produces a negative output and an output signal appears across the terminals 35 and 36.

When a voltage of the predetermined amplitude is applied to two of the windings 41–43, the output of amplifier 40 rises to a positive value (positive being in the sense that lead 46 goes positive with respect to lead 47). This is passed to the input winding 48 of a third magnetic amplifier 49, a diode 50 being included in the connections to ensure that a voltage is applied to the winding 48 only in the event of there being a positive output from the amplifier 40. The output of amplifier 49 is passed to the mode switch 9A where it is applied through a normally closed contact FB across the forward stepping winding F of the mode switch stepping mechanism 51. Contact FB is arranged in known manner so that it is open whenever a step is in progress.

It will be seen that as a result of these connections, when the prime land relay PL is energised and the mode switch is in position 8, the following operation will ensue, assuming correct operation in all three sub-channels. Initially, assuming the aircraft to be higher than 150 ft., the signal applied to winding 31 of amplifier 30 will be greater than that applied to winding 29. The same will apply in altitude controls 14B and 14C. Reverting to sub-channel A alone, at some moment as the aircraft's altitude reaches 150 ft., an output voltage will appear at terminals 35 and be applied to the input winding 41 of amplifier 40. This may or may not occur at the same moment that the same voltages are applied to windings 42 and 43 from the altitude controls 14B and 14C. However, amplifier 40 will not produce an output until there is a voltage applied to two of the three windings 41–43. When it does, and the same thing will happen simultaneously in the amplifiers 40 of the actuators 10B and 10C since all three receive switching signals from the altitude controls of all three sub-channels, the amplifier 40 will produce a positive output which is applied to amplifier 49. The consequent output from the amplifier 49 energises the forward stepping winding F and moves the wiper of mode switch 9A on to switch position 9, that is to say, to the position for the attitude phase. This will occur substantially simultaneously in all three sub-channels when the altitude controls in two of these have produced the response corresponding to the aircraft reaching a height of 150 ft.

On stepping to switch position 9, the wiper MS1W effects a change in the circuit interconnecting the altimeter 6 and the input winding 29 of amplifier 30. More particularly, a resistor 52 replaces the resistor 28 with the result that the voltage applied to winding 29 is reduced to that corresponding to the height selected for commencement of the flare phase, for example 50 ft. As soon as this happens, the output at terminals 35 will drop to zero, as will the output of amplifier 40. Therefore, when contact FB closes at the end of the step to switch position 9 there is no output from amplifier 49 and the mode switch remains still.

The sequence of events is again repeated at or near the altitude of 50 ft. The mode switches 9 will all take a further step simultaneously when two of the altitude controls 14 produce an output consequent upon the aircraft reaching a height of 50 ft., moving the wiper to switch position 10.

Similarly, in switch position 10, a resistor 53 replaces resistor 52 in the circuit interconnecting the altimeter 6 and the input winding 29 of amplifier 30, so that the voltage applied to the winding 29 is that corresponding to the altitude of 20 ft., selected for the commencement of the land phase.

It will thus be seen that each step in the sequence is controlled in each of the sub-channels so as to occur only when the criterion for that step has been achieved in at least two of the sub-channels, the altitude controls 14 acting as discriminating means which are set up for each step of the sequence to produce a switching signal when the altitude signal reaches the value specified for the step concerned. The switching signals are applied to the actuators 10, which each control the switching in the sub-channel to which they belong, to initiate the step concerned only on receipt of a predetermined number, in this case two, of the switching signals. Thus any differences in timing which might otherwise arise between the sub-channels either as a result of permissible operational differences or, more importantly, as a result of fault conditions, are avoided. Preferably, to guard against a fault condition in any of the amplifiers 30 such that an excessive output is produced sufficient on its own to cause an amplifier 40 to produce an output, limiting devices (e.g. a pair of diodes connected in opposite senses across the leads concerned) are connected across each pair of leads coupling the output of the altitude controls 14 to input windings of amplifiers 40 in the sub-channels other than that to which the altitude control belongs. The fault condition is thus restricted to the sub-channel in which it arises, and cannot give rise to false outputs from the amplifier 40 in all three sub-channels.

When all three sub-channels are operating normally, slight differences in timing will usually arise in the generation of the switching signals by the altitude controls 14 when the altitude reaches the specified value, but the step will only be taken when two switching signals are produced. A fault may however give rise to a condition wherein the switching signal for a given step is produced in one sub-channel long before, or would be produced long after, it is produced in the other sub-channels. Assuming the other two sub-channels are operating normally, however, the operation of the circuits will be little affected as the step will occur in all three sub-channels simultaneously either when the first of the other sub-channels produces a switching signal or when both the other sub-channels produce a switching signal, depending on the actual effect of the fault.

There remains to be described the circuit in the mode switch actuator 10A which is employed to set the mode switch to position 8 when it is required to commence the track phase of a landing manoeuvre. This is initiated in the flight controller 13 by closing a switch 54 when the aircraft is suitably positioned with respect of the beams of an I.L.S. transmitter. This closes a circuit between a terminal 55 in the flight controller and the aforementioned terminal 27, through switch 54 and the winding of a relay G. Relay G has a single contact G1 located in the actuator 10A and associated with a second bank MS2 of contacts of the mode switch 9. In this second bank, contact MS2/11 is permanently connected to the wiper MS2W and is also connected to a lead 56. Lead 56 is connected to one side of the winding of a relay RDO, the other side of which is grounded. Lead 56 is also connected to the moving contact of a normally closed contact FDO1 of a relay FDO, the fixed contact of which is connected to that side of the input winding 41 in amplifier 40 which is not grounded. The winding of relay FDO is connected between a lead 57 and ground and, under the conditions being considered, no voltage is applied to lead 57 whereby relay FDO remains unenergised with its contact FDO1 closed.

Prior to closure of switch 54 and energisation of relay G, the mode switch 9 may have been in any one of switch positions 1–7 which are the positions corresponding to the manually selectable modes of the elevator channel. In the contact bank MS2, contacts MS2/1–7 are connected together and to one side of the normally open contact G1, the other side of which is connected to a terminal 58 to which a negative switching voltage is applied. As a result, when the wiper of switch 9 is in any one of positions 1–7, closure of contact G1 completes a circuit from terminal 58 through said contact G1, contact bank MS2, lead 56, contact FDO1 and the input winding 41 of amplifier 40 to ground. At the same time, a similar operation will take place in channels B and C with the result that the predetermined voltage is applied simultaneously to all three windings 41–43. Amplifier 40 then produces a positive output which in turn will cause a forward step of the mode switch 9, and which will continue to cause forward steps until the wiper of mode switch 9 reaches position 8 at which time the circuits energising the windings 41–43 will be broken at the contact bank MS2.

It may be noted here that forward stepping of the switch 9, when changing from one of the manually selectable modes to another, is effected in like manner by applying a negative voltage to a terminal 59 which is connected to lead 56. In addition, the application of a negative voltage to lead 56 energises the winding of relay RDO thus opening a normally closed contact RDO1 which is connected between lead 57 and one side of the input winding 45 of amplifier 40, the other side being grounded. The winding of relay FDO is connected between lead 57 and ground. If, therefore, during switching from one manually selectable mode to another, a reverse step is required, a negative voltage is applied to a terminal 60 which is connected to lead 57 and thus to the input winding 45. At the same time, relay FDO is energised to open contact FDO1, thus ensuring that no forward stepping voltage can be applied to the amplifier 40. Input winding 45 is arranged so that the amplifier 40 produces a negative output across leads 46 and 47, and diode 50 prevents this negative output from affecting amplifier 49. However, this negative output across leads 46 and 47 is operative to produce an output from a further amplifier 61, the input winding 62 of which is coupled across the output of amplifier 40 by a circuit including a diode 63 poled in a sense opposite to that of diode 50. The output of amplifier 61 is connected to the mode switch 9, any voltage appearing across it being applied through a normally closed contact FR to the reverse stepping winding R of the stepping mechanism 51. Contact FR operates in a similar manner to contact FB in the forward stepping circuit to ensure that only a single step is taken at a time unless the negative voltage at terminal 60 is deliberately maintained in order to initiate a series of reverse steps.

Winding 44 of amplifier 40 is provided in case it is required to revert from triplex operation of all three sub-channels to a condition in which one sub-channel only is employed. Obviously, when this occurs some provision must be made so that amplifier 40 can in fact respond to the application of the predetermined voltage to only one of its input windings 41–43, since the other two sub-channels will be inoperative. To achieve this, a special circuit is provided which applies a voltage to the winding 44 which is equal to the predetermined voltage. This circuit is closed by a contact of the relay PL which is energised on closing the prime land switch 25. Details of this latter circuit are shown in FIGURE 3, from which it will be seen that one side of winding 44 is connected to a terminal 65 which is maintained at a negative voltage. The other side of winding 44 is connected through a resistor 66, the winding of a relay SCP, a normally open contact PL2 of relay PL and a switch 67 which is normally open, to ground. Switch 67 is closed manually when it is required to revert to single sub-channel operation. When this has been done, and when relay PL is energised on closing the prime land switch 25, this series circuit is closed with the result that the predetermined voltage is applied across winding 44. A resistor 68 and a pair of Zener diodes 69 are connected in parallel between the terminal of resistor 66 remote from the input winding 44 and a terminal 70 which is maintained at the negative voltage. This determines the magnitude of the voltage applied across resistor 66 and winding 44 when the circuit is closed.

At the same time relay SCP is energised. This relay has two contacts SCP1 and SCP2 which are normally closed and, which, assuming the amplifier 40 shown in FIGURE 3 belongs to sub-channel A, are connected in leads connecting windings 42 and 43 to the altitude controls 14B and 14C. When relay SCP is energised, these contacts open, ensuring that no spurious voltages can be applied to windings 42 and 43, and that the operation of amplifier 40 can be controlled only by the voltages applied to winding 41.

Whilst a particular application of the invention has been described it will be appreciated that it is broadly applicable to any control system in which, firstly, there is a channel having a plurality of sub-channels arranged to operate in parallel and wherein, secondly, a switching sequence is to be carried out under the control of signals and circuits individual to the sub-channels. The number of sub-channels can be other than three, and although the operation will usually be such that a majority of the sub-channels have to reach the conditions for a given step in the sequence before the step is taken in all the sub-channels simultaneously, it may be possible in some cases to require the condition to be reached in any predetermined number (greater than one) of the sub-channels.

The form of the particular circuits employed is of course immaterial to the invention, the requirement simply being that the condition for taking a step shall be sensed individually by some form of discriminating means in the various sub-channels (i.e. by the altitude controls 14 in the example) and that each sub-channel shall include switching control means for initiating a step only when the condition has been sensed in a predetermined number of the sub-channels (i.e. the amplifier 40 in the actuators 10 in the example).

What I claim is:

1. In an automatic control system of the type which includes a plurality of sub-channels operating in parallel with one another and selectively switchable from a first operational mode to a second operational mode when a predetermined variable quantity has attained a predetermined value, the combination comprising means for supplying controlling signals varying with variations in said variable quantity, a plurality of signal discriminating means associated one with each of said sub-channels, said signal discriminating means including means responsive to said controlling signals and operative to emit a predetermined switching signal when said variable quantity attains at least substantially said predetermined value, and a plurality of switching control means coupled to said plurality of signal discriminating means and associated one with each sub-channel, each switching control means including means operative to switch its associated sub-channel from said first operational mode to said second operational mode in response to the condition in which a predetermined number, greater than one, of said signal discriminating means emit said predetermined switching signal.

2. An automatic control system according to claim 1, wherein said predetermined number is a number greater than half of said plurality of sub-channels.

3. In an automatic control system of the type including three sub-channels operating in parallel with one another and selectively switchable from a first operational mode to a second operational mode appropriate to the circumstances in which a predetermined variable quantity has attained a predetermined value, the combination comprising means for supplying controlling signals dependent upon the magnitude of said variable quantity, three signal discriminating means associated one with each sub-channel, each said signal discriminating means being responsive to said controlling signals to emit a predetermined switching signal when said variable quantity attains said predetermined value, and three switching control means associated respectively with said three sub-channels and each responsive to the condition in which at least two of said three signal discriminating means emit said predetermined switching signal to switch the respectively associated sub-channel from said first operational mode to said second operational mode.

4. In an automatic control system, a plurality of sub-channels operative in parallel with one another and each selectively switchable from one to another of a plurality of operational modes, means for supplying control signals dependent upon variations of a predetermined variable quantity, a plurality of datum selecting means each of which is associated with a respective one of said sub-channels to supply different datum signals sequentially in response to switching of the respectively associated sub-channel through said different operational modes, a plurality of signal discriminating means each of which is associated with a respective sub-channel, said signal discriminating means each including means responsive both to a respective one of said control signals and to the said datum signals supplied by the datum selecting means of the respective sub-channel to emit a predetermined switching signal when a predetermined relationship exists between said control and datum signals, and a plurality of switching control means coupled to said plurality of signal discriminating means and associated one with each sub-channel, each switching control means being operative to switch its associated sub-channel from one mode to the next in response to the condition in which a predetermined number, greater than one, of said signal discriminating means emit said predetermined switching signal.

5. The system of claim 4 wherein each said signal discriminating means comprises a magnetic amplifier having first and second input windings, said amplifier including an output winding operative to supply said switching signal when a signal applied to said first input winding exceeds a signal applied to said second input winding, and means for supplying said control and datum signals ot said first and second input windings respectively.

6. The system of claim 4 wherein each switching control means includes a magnetic amplifier having a plurality of different control windings coupled to different ones of said signal discriminating means for receiving any said switching signals emitted thereby, each said amplifier including output means operative to switch its associated sub-channel from one operational mode to the next in response to the condition in which said switching signal is received by a majority of said control windings.

7. In an automatic control system, a plurality of sub-channels for actuating a common output concurrently with one another and each selectively switchable from one to another of a plurality of operational modes, means to supply controlling signals in accordance with variation of a predetermined variable quantity, a plurality of datum selecting means each of which is associated with a respective one of said sub-channels to define different datum values of said variable quantity sequentially in response to switching of the respectively associated sub-channel through the different operational modes in a predetermined sequence, a plurality of signal discriminating means each of which is associated with a respective sub-channel and each of which includes means responsive both to a said controlling signal and to the datum value defined by the datum selecting means of the respective sub-channel to emit a switching signal when the controlling signal attains the defined datum value, and a plurality of switching control means each of which is associated with a respective one of the sub-channels for switching the associated sub-channel from one mode to the next in said predetermined sequence in response to the condition in which a predetermined number, greater than one, of said signal discriminating means emit said switching signal.

8. An automatic control system comprising a plurality of sub-channels which operate in parallel with one another and which are each selectively switchable from one mode to another of a plurality of operational modes, each said sub-channel comprising means to supply a controlling signal in accordance with variation of a predetermined variable quantity, datum selecting means for defining a different datum value of said variable quantity through each of the different operational modes of the sub-channel, signal discriminating means jointly responsive to said controlling signal and to the datum value defined by the datum selecting means to emit a predetermined switching signal when said variable quantity attains the defined datum value, and switching control means for switching the sub-channel from one mode to the next in a predetermined sequence of said operational modes when the signal discriminating means of a predetermined number, greater than one, of all said sub-channels emit said predetermined switching signal.

9. An automatic flight control system comprising more than two sub-channels which are operative concurrently to actuate a common aircraft control surface, said sub-channels each being selectively switchable from one mode to another of a plurality of operational modes, and means to supply to each sub-channel a controlling signal varying with variations in a predetermined variable quantity, each said sub-channel including datum selecting means for defining a different datum value of said variable quantity throughout each of the different operational modes of the sub-channel, each sub-channel further including signal discriminating means responsive to the controlling signal supplied thereto and to the datum value defined by the datum selecting means in said sub-channel to emit a predetermined switching signal when the variable quantity attains the defined datum value, and switching control means in each said sub-channel for switching the sub-channel from one mode to the next in a predetermined sequence of said operational modes in response to the condition in which the signal discriminating means of a majority of said sub-channels emit said predetermined switching signal.

10. The flight control system of claim 9 wherein said variable quantity is aircraft height.

11. The flight control system of claim 10 wherein said means supplying said controlling signal includes a radio altimeter.

12. An automatic flight control system comprising three sub-channels which are operative concurrently to actuate a common aircraft control surface, said sub-channels each being selectively switchable from one mode to another of a plurality of operational modes, means for applying to each said sub-channel a controlling signal dependent upon aircraft altitude, datum selecting means in each said sub-channel for defining a different datum value of altitude throughout each of the different operational modes of the sub-channel, signal discriminating means in each said sub-channel responsive to the controlling signal applied thereto and to the datum value defined by said datum selecting means to emit a predetermined switching signal when the aircraft altitude attains the defined datum value, and switching control means in each said sub-channel for switching said sub-channel from one mode to the next in a predetermined sequence of said operational modes in response to the condition in which said predetermined switching signal is emitted by the signal discriminating means of at least two of the three sub-channels.

13. An automatic control channel for an aircraft automatic flight control system, said control channel comprising a plurality of sub-channels operative concurrently with one another to actuate common control surface means of the aircraft, each said sub-channel individually comprising signal source means producing signals dependent upon predetermined manoeuvres of the aircraft, said source means including means providing a signal related to a variable quantity which varies upon actuation of said control surface means; computer means selectively switchable from a first to a second operational mode, said computer means being responsive, in each of its said operational modes, to signals provided by said signal source means to provide a manoeuvre demand signal, servo means for actuating said control surface means in response to the manoeuvre demand signal provided by said computer means, datum defining means coupled to said computer means for defining, during operation of said computer means in its said first operational mode, a datum value of said variable quantity; discriminating means coupled both to said datum defining means and to said signal source means for providing a switching signal when said variable quantity reaches said datum value; and switching control means for switching said computer means to its said second operational mode when the discriminating means in a predetermined number of said sub-channels emit said switching signal.

14. The combination of claim 13 wherein said plurality of sub-channels comprises more than two sub-channels, said predetermined number of sub-channels comprising a majority of said sub-channels.

15. An automatic pitch control channel for an automatic flight control system of an aircraft, said control channel comprising more than two sub-channels for actuating concurrently with one another pitch control surface means of the aircraft, each said sub-channel individually comprising signal source means for providing signals in accordance with at least height and pitch manoeuvres of the aircraft; pitch computer means responsive to signals provided by said signal source means to provide a pitch demand signal, said computer means including means selectively switchable to any one of a plurality of different operational modes appropriate respectively to different successive phases of a landing manoeuvre; a servo system for actuating said pitch control surface means in accordance with the pitch demand signal provided by said pitch computer means; reference signal means for providing signals defining a plurality of different datum values related respectively to different aircraft heights at which different successive phases of said landing manoeuvre should be commenced, said reference signal means being coupled to said pitch computer means to define during each said phase the datum value of height appropriate to commencement of the next successive phase; signal discriminating means coupled to the reference signal means and to said signal source means to provide a switching signal when the aircraft height is substantially equal to the datum value of height then being defined by said reference signal means; and switching means for switching said pitch computer means to the operational mode appropriate to said next successive phase of said landing manoeuvre in response to the condition in which the signal discriminating means of a majority of said sub-channels emit said switching signal.

16. In an automatic control system, a plurality of control circuits operative substantially concurrently with one another for effecting a preselected control operation, each said control circuit including means selectively switchable in sequence from one to another of a plurality of different operational modes forming portions of said preselected control operation, means for supplying a control signal having a magnitude varying with variations of a predetermined variable quantity, a plurality of reference signal means each of which is associated with a respective one of said control circuits for supplying a plurality of different reference signals sequentially, said reference signals being related respectively to said different operational modes, a plurality of signal discriminating means each of which is associated with a respective control circuit and each of which includes means jointly responsive both to said control signal and to a reference signal then being supplied by said reference signal means for producing a switching signal upon occurrence of a predetermined relationship between said control and reference signals, and a plurality of switching means coupled to said plurality of signal discriminating means and associated one with each control circuit, each switching means including means operative to switch its associated control circuit from one to the next of said operational modes each time a predetermined number, greater than one, of said signal discriminating means emit said predetermined switching signal.

17. The system of claim 16 wherein each said signal discriminating means comprises amplifier means having at least first and second inputs, and means for supplying said control and reference signals to said first and second inputs respectively.

References Cited by the Examiner

UNITED STATES PATENTS

| 2,686,285 | 8/54 | Meredith et al. | 244—77 |
| 3,054,039 | 9/62 | Meredith | 244—77 |
| 3,078,398 | 2/63 | Fearnside | 244—77 |

LLOYD McCOLLUM, *Primary Examiner.*